(12) United States Patent
Chang

(10) Patent No.: US 9,409,614 B2
(45) Date of Patent: Aug. 9, 2016

(54) BICYCLE SADDLE STRUCTURE

(71) Applicant: Nan Kai University of Technology, Nantou County (TW)

(72) Inventor: Teng-Ruey Chang, Taichung (TW)

(73) Assignee: Nan Kai University of Technology, Caotun Township (TW)

( * ) Notice: Subject to any disclaimer, the term of this patent is extended or adjusted under 35 U.S.C. 154(b) by 60 days.

(21) Appl. No.: 14/538,578

(22) Filed: Nov. 11, 2014

(65) Prior Publication Data

US 2015/0321718 A1    Nov. 12, 2015

(30) Foreign Application Priority Data

May 12, 2014  (TW) .............................. 103208243 U

(51) Int. Cl.
| | |
|---|---|
| B62J 1/00 | (2006.01) |
| B62J 1/04 | (2006.01) |
| B62J 1/08 | (2006.01) |
| B62J 1/02 | (2006.01) |

(52) U.S. Cl.
CPC .. *B62J 1/04* (2013.01); *B62J 1/005* (2013.01); *B62J 1/007* (2013.01); *B62J 1/02* (2013.01); *B62J 1/08* (2013.01)

(58) Field of Classification Search
CPC .................................. B62J 1/005; B62J 1/04
USPC ....................................................... 297/201
See application file for complete search history.

(56) References Cited

U.S. PATENT DOCUMENTS

| | | | | |
|---|---|---|---|---|
| 554,337 | A * | 2/1896 | Dodds et al. ............... | B62J 1/02 297/201 |
| 633,487 | A * | 9/1899 | Radermacher ........... | B62J 1/005 297/201 |
| 4,877,286 | A * | 10/1989 | Hobson .................... | B62J 1/002 297/201 |
| 5,352,016 | A * | 10/1994 | Hobson ...................... | B62J 1/10 297/201 |
| 5,823,618 | A * | 10/1998 | Fox ........................... | B62J 1/005 297/195.1 |
| 5,911,474 | A * | 6/1999 | Lee ........................... | B62J 1/005 297/201 |
| 6,074,002 | A * | 6/2000 | Hansen .................... | B62J 1/002 297/201 |
| 6,113,184 | A * | 9/2000 | Barnes ..................... | B62J 1/007 297/197 |
| 6,209,954 | B1 * | 4/2001 | Bombardier ............. | B62J 1/005 297/201 |
| 6,575,529 | B1 * | 6/2003 | Yu ............................ | B62J 1/10 297/201 |

(Continued)

*Primary Examiner* — David E Allred
*Assistant Examiner* — Alexander Harrison
(74) *Attorney, Agent, or Firm* — Wang Law Firm, Inc.

(57) ABSTRACT

A bicycle saddle structure includes a saddle portion having two elastic supporting bodies in a bottom surface thereof and a nose position pivoted to the saddle portion, the elastic supporting bodies are circular spiral-shaped, which can provide a buffer force to the rider, so as to improve the riding comfort. The nose portion can be selectively located at the same level as or vertical to the saddle portion via a pivoting unit, the saddle can be changed to the nose-shaped saddle or the saddle without nose portion, so as to improve the applicability.

11 Claims, 17 Drawing Sheets

(56) References Cited

U.S. PATENT DOCUMENTS

| | | | | |
|---|---|---|---|---|
| 6,786,542 B1* | 9/2004 | Nuzzarello | B62J 1/005 | 297/195.1 |
| 7,121,622 B1* | 10/2006 | Mendez | B62J 1/00 | 297/201 |
| 7,416,253 B2* | 8/2008 | Kim | A47C 1/023 | 297/201 |
| 7,581,787 B2* | 9/2009 | Livne | B62H 5/00 | 297/201 |
| 7,628,451 B2* | 12/2009 | Chuang | B62J 1/005 | 297/201 |
| 8,002,347 B2* | 8/2011 | Geyer | B62J 1/00 | 297/195.1 |
| 8,061,767 B2* | 11/2011 | Kunzler | A47C 3/025 | 297/196 |
| 8,894,591 B2* | 11/2014 | Hiki | A61H 1/024 | 297/201 |
| 2003/0067195 A1* | 4/2003 | Sylvester | B62J 1/005 | 297/201 |
| 2008/0001445 A1* | 1/2008 | Lee | B62J 1/00 | 297/201 |
| 2009/0179466 A1* | 7/2009 | Tsai | B62J 1/08 | 297/201 |
| 2012/0086246 A1* | 4/2012 | Belliveau | B62J 1/00 | 297/201 |
| 2012/0286548 A1* | 11/2012 | Bailie | B62J 1/10 | 297/201 |
| 2014/0375092 A1* | 12/2014 | Curless | B62J 1/005 | 297/201 |

* cited by examiner

BICYCLE SADDLE STRUCTURE

BACKGROUND OF THE INVENTION

1. Field of the Invention

The present invention relates to a bicycle saddle structure, and more particularly to a bicycle saddle and a bicycle seat.

2. Description of the Prior Art

Bicycles are often used as transportation, leisure or fitness purposes. As a means of transportation without extra energy consumption, the bicycle has a green, environmentally friendly transportation title. The rider can enjoy the surrounding scenery during slow riding, achieving leisure and pressure releasing effects. In addition, a sporty bicycle can achieve the fitness purpose through high speed riding.

Referring to FIG. 1, a conventional nose-shaped bicycle saddle X comprises a seat portion X1 and a nose portion X2 forwardly protruded out of a center of the seat portion X1, the seat portion X1 is used to support the rider's hips. However, the seat portion X1 has no buffer parts, which will cause the rider discomfort during long time riding or when riding on the bumpy road. In addition, although the nose portion X2 provides stable supporting points to the feet of the rider, the nose portion X2 will become an obstacle to the feet during slow riding, which will also cause the rider discomfort. In order to overcome these problems, another conventional bicycle saddle without nose portion is developed, however, such a saddle cannot provide a stable point of application to the rider during high speed riding. It is thus obvious that the above-mentioned saddles cannot meet the needs of different riders, the rider has to replace different kinds of saddles according to different requirements, which is inconvenient and will cause extra costs.

The present invention has arisen to mitigate and/or obviate the afore-described disadvantages.

SUMMARY OF THE INVENTION

The primary objective of the present invention is to provide a bicycle saddle structure that can improve the discomfort of an ordinary nose-shaped saddle during riding and can provide a stable point of application to the rider when changing to the saddle without nose portion.

To achieve the above objective, a bicycle saddle structure in accordance with the present invention comprises: a saddle body and a nose portion.

The saddle body is connected to a seat post of a bicycle and is provided with a saddle portion and two circular spiral elastic supporting bodies. The saddle portion has a top surface and an opposite bottom surface, between the top surface and the bottom surface is provided a lateral surface. The elastic supporting bodies are disposed on the bottom surface and are located adjacent to each other.

The nose portion is pivoted to one side of the saddle portion of the saddle body via a pivoting unit and has a top surface and an opposite bottom surface. The top surface of the nose portion is connected to the bottom surface of the nose portion via a lateral surface. The top surface of the nose portion can be selectively located at the same level as or vertical to the top surface of the saddle portion via the pivoting unit.

Since the nose portion is pivoted to the saddle portion via the pivoting unit, the nose portion can be selectively fixed to different positions, the saddle can be changed to the nose-shaped saddle or the saddle without nose portion, so as to improve the applicability. The elastic supporting bodies which are disposed on the bottom surface of the saddle body can provide a buffer force to the rider, so as to improve the riding comfort.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Referring to FIGS. 2-17, a bicycle saddle structure in accordance with the present invention comprises a saddle body 10 and a nose portion 20.

Figure 6:
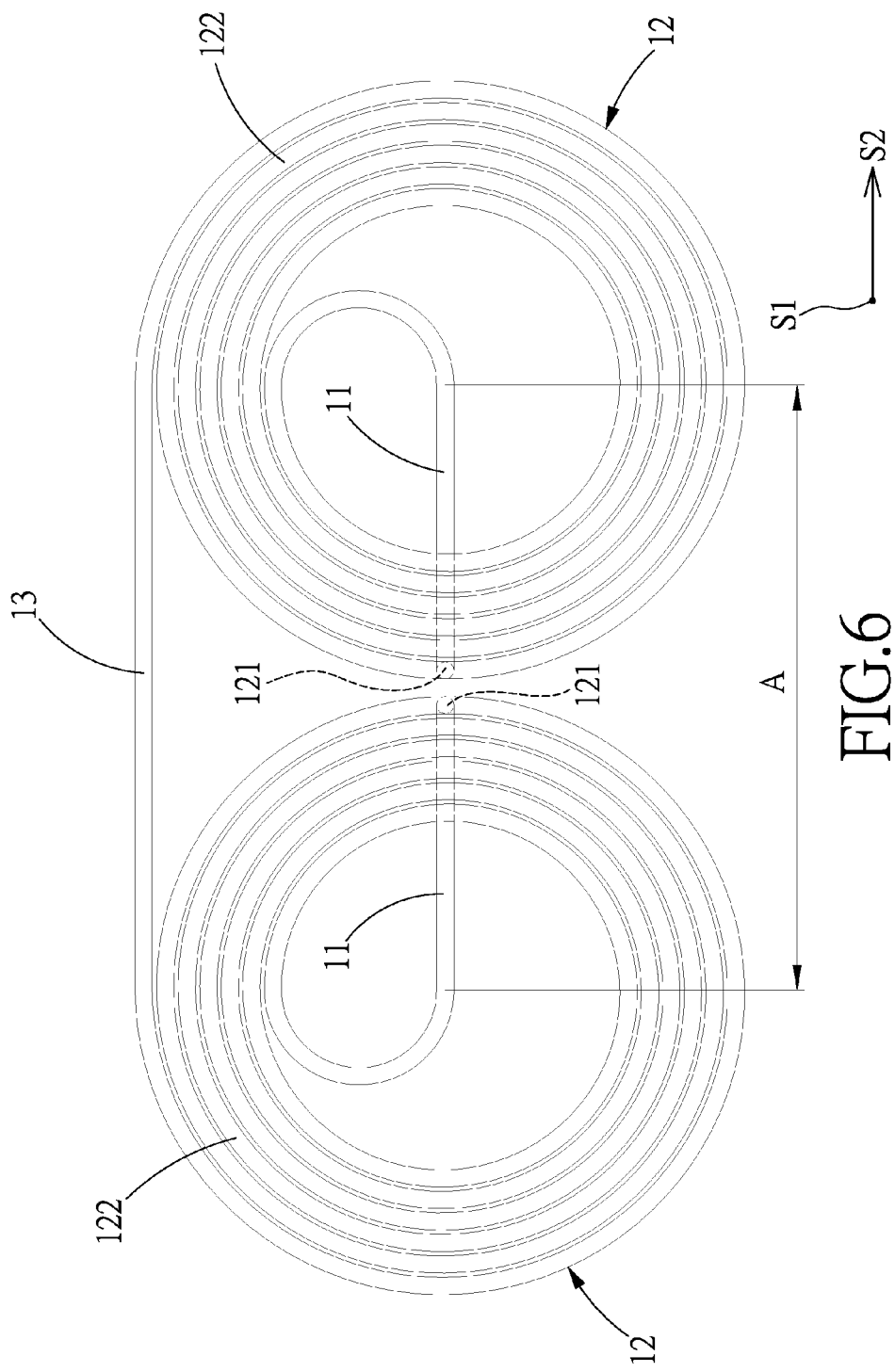
FIG. 6 is a top view of two elastic supporting bodies of the bicycle saddle structure in accordance with the present invention.
Figure 7:
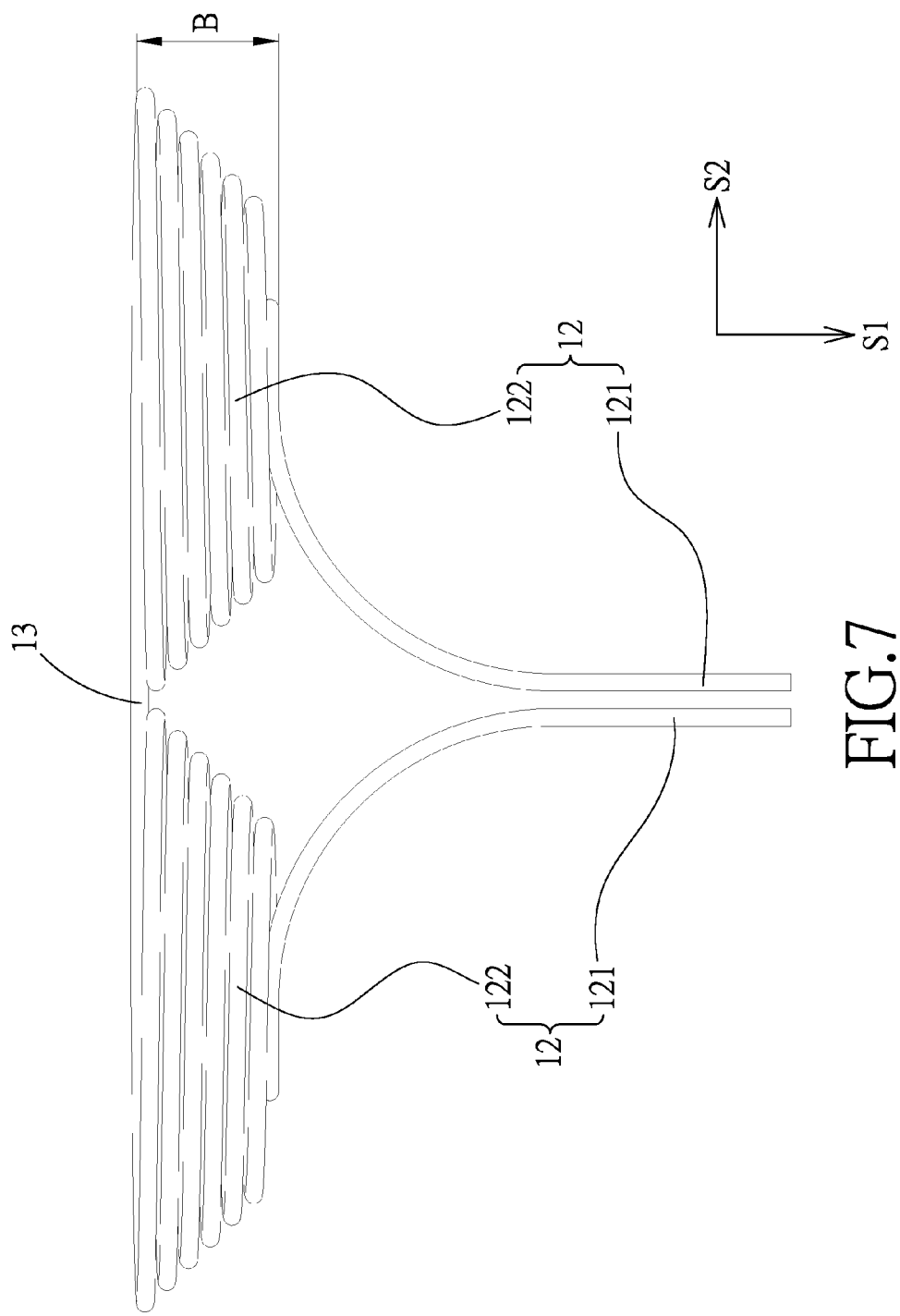
FIG. 7 is a side view of the two elastic supporting bodies of the bicycle saddle structure in accordance with the present invention.
Figure 8:
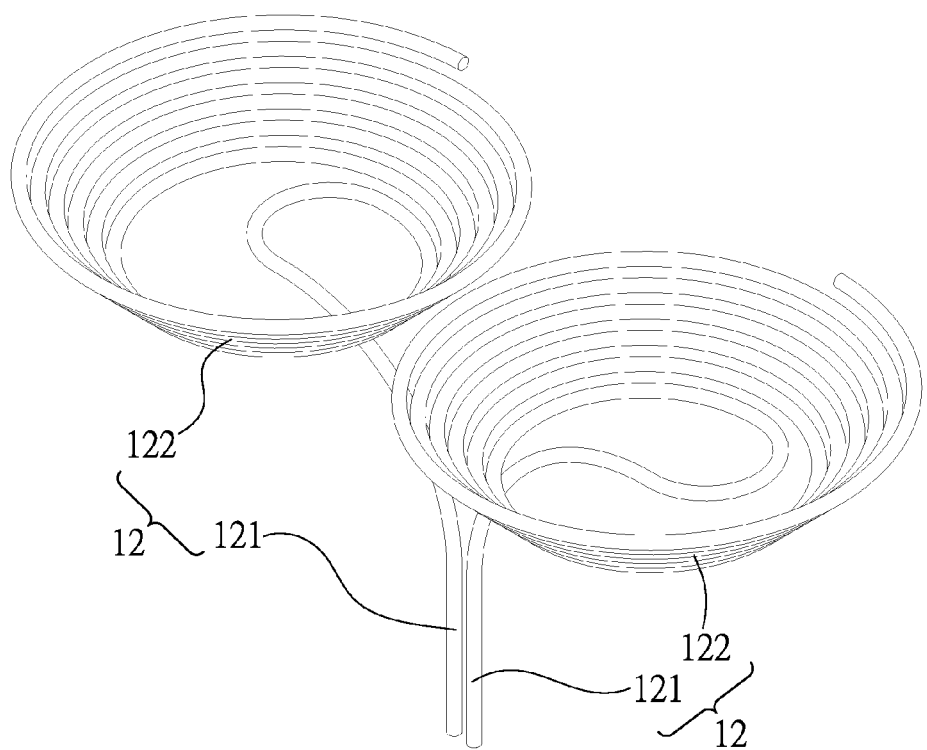
FIG. 8 is an illustrative view of the two elastic supporting bodies of the bicycle saddle structure in accordance with the present invention.

The saddle body 10 is connected to a seat post Y1 of a bicycle Y and is provided with a saddle portion 11 and two circular spiral elastic supporting bodies 12. The saddle portion 11 has a top surface 111 and an opposite bottom surface 112, between the top surface 111 and the bottom surface 112 is provided a lateral surface 113. The elastic supporting bodies 12 are disposed on the bottom surface 112 and are located adjacent to each other. Each elastic supporting body 12 is formed by an extension portion 121 and an elastic portion 122 formed at one end of the extension portion 121. The extension portion 121 is extended along a vertical direction S1, and a horizontal direction S2 is vertical to the vertical direction S1. The elastic portion 122 is a spiral cone structure enlarged from the extension portion 121 gradually, and the spiral number of the elastic portion 122 is six. A center distance A between the elastic portions 122 in the horizontal direction S2 is 8 to 15 cm as shown in FIG. 6. A height B of each elastic portion 122 is 1 to 3 cm as shown in FIG. 7, and the ends of the elastic portions 122 away from the extension portions 121 are connected by a connecting section 13. The ends of the elastic portions 122 away from the extension portions 121 can also be separated from each other without using the connecting section 13 as shown in FIG. 8. The saddle portion 11 can also be independently assembled to the seat post Y1 without using the two elastic supporting bodies 12.

Figure 9:
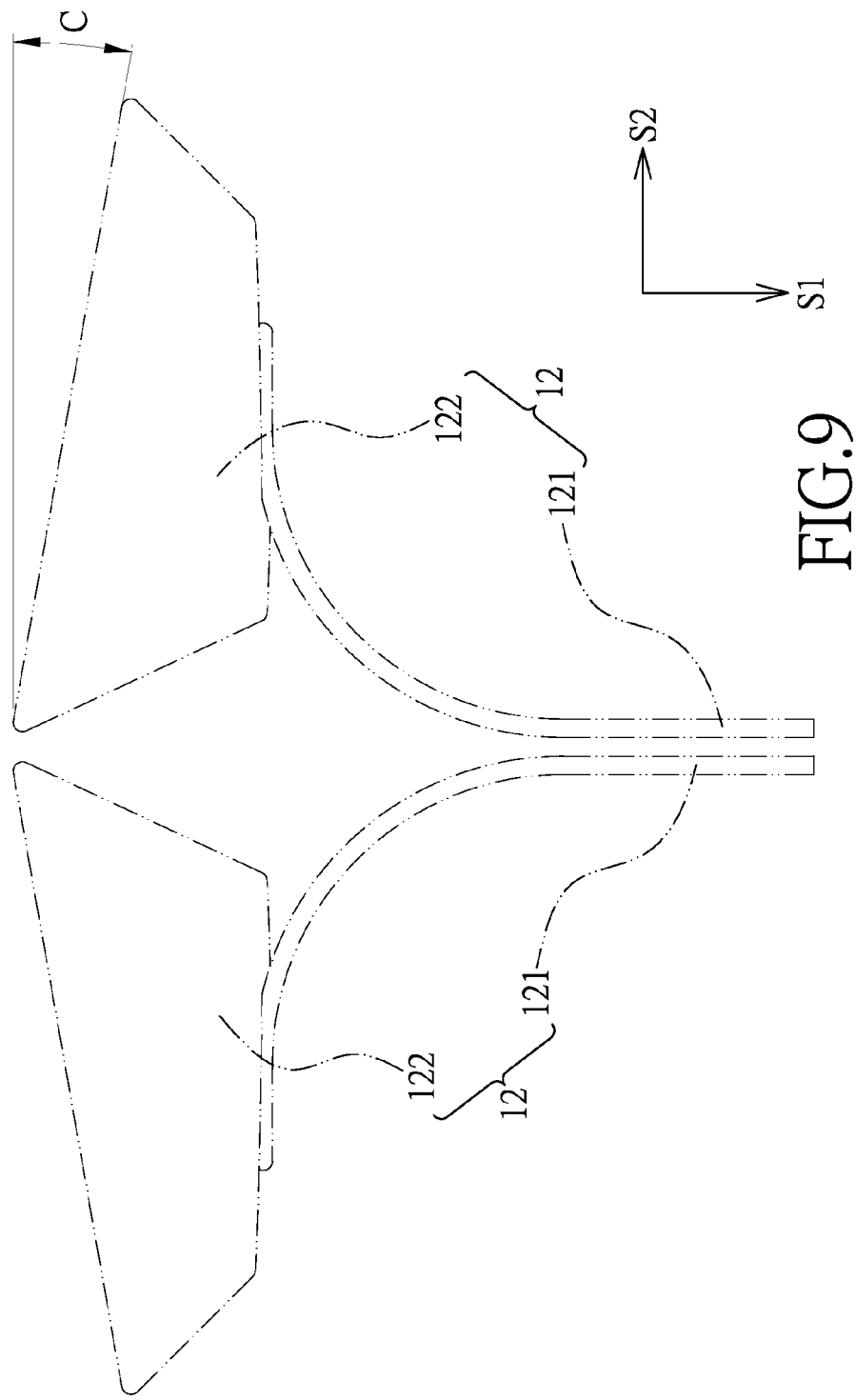
FIG. 9 is another illustrative view of the two elastic supporting bodies of the bicycle saddle structure in accordance with the present invention.
Figure 10:
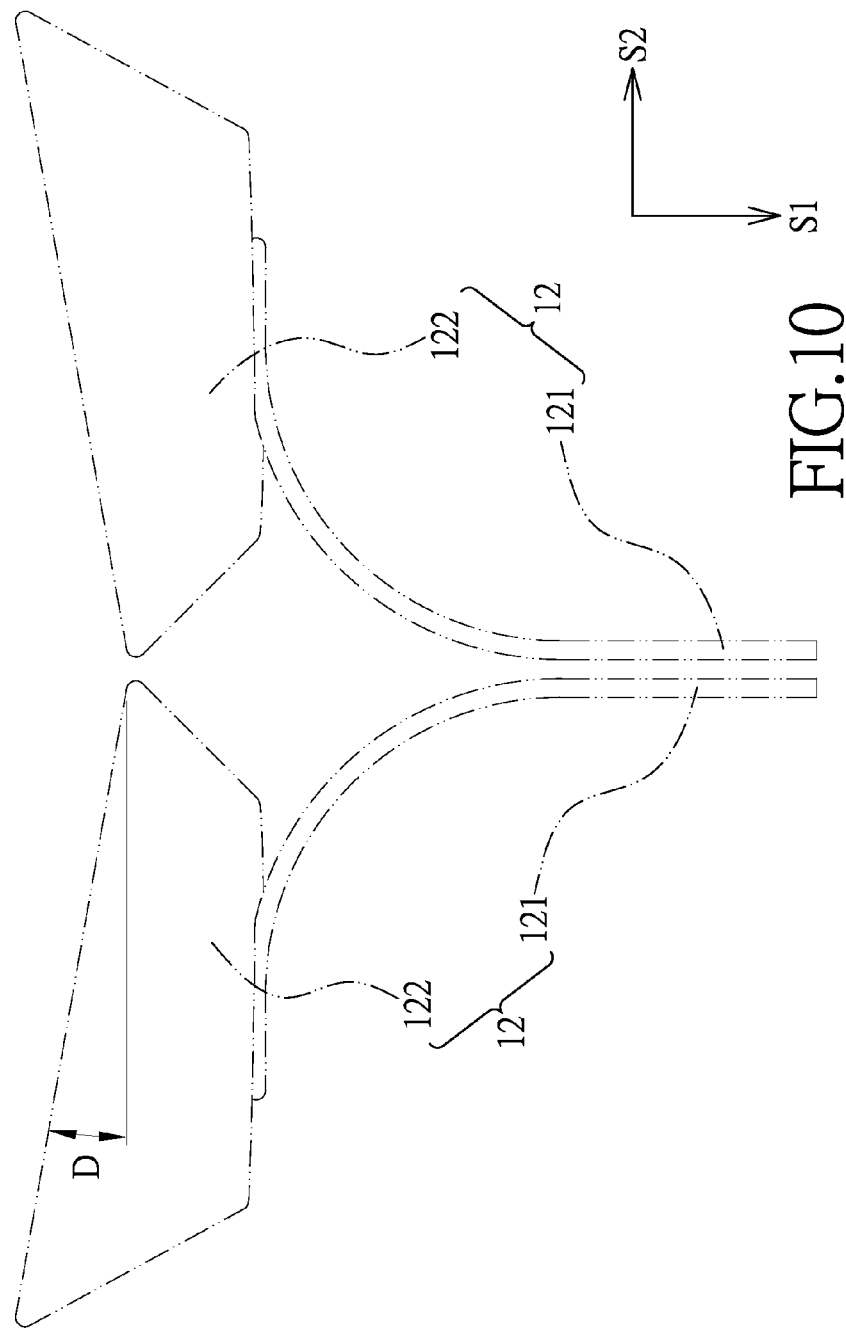
FIG. 10 is another illustrative view of the two elastic supporting bodies of the bicycle saddle structure in accordance with the present invention.
Figure 11:
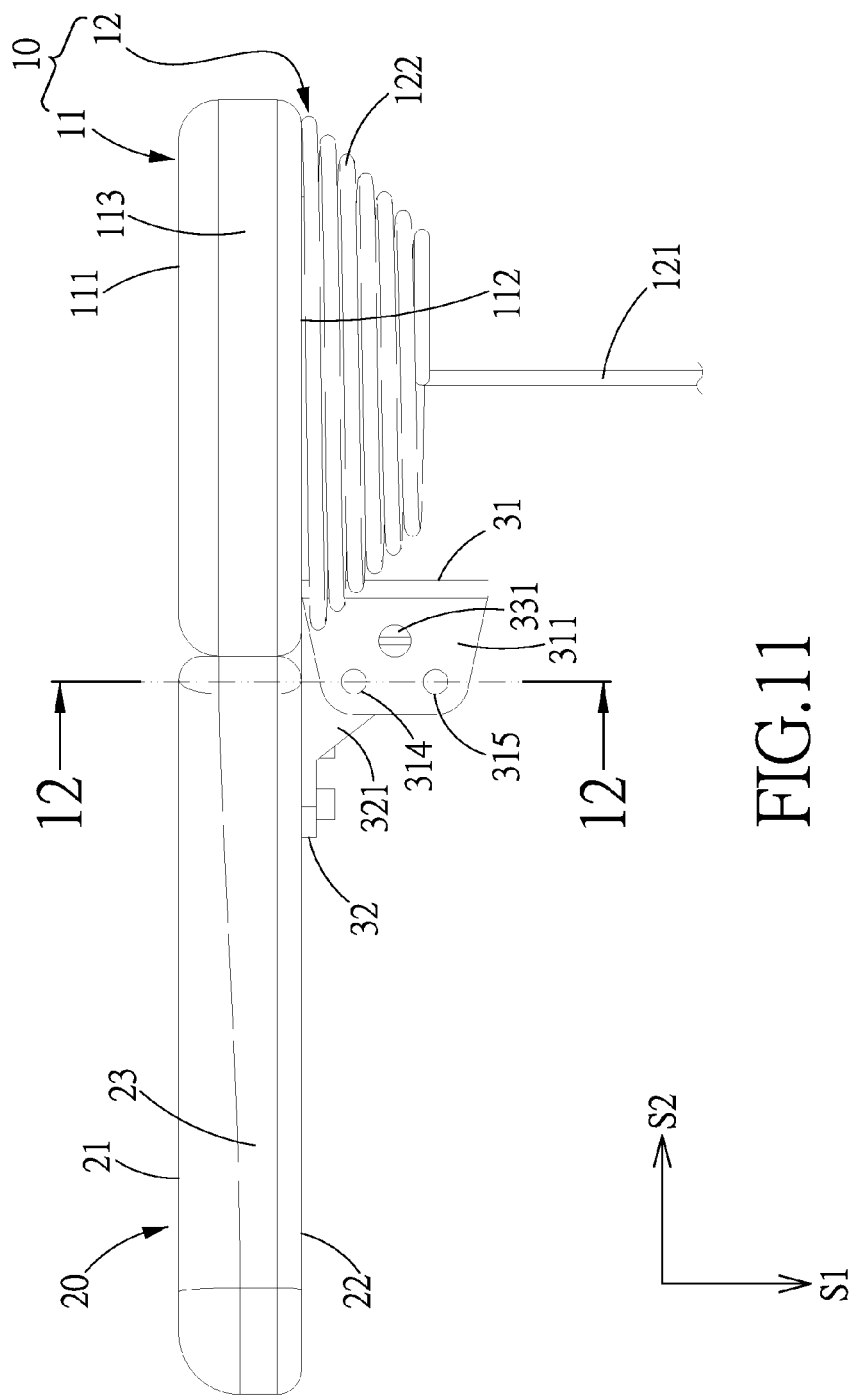
FIG. 11 is a side view of the bicycle saddle structure with the nose portion in accordance with the present invention.
Figure 12:
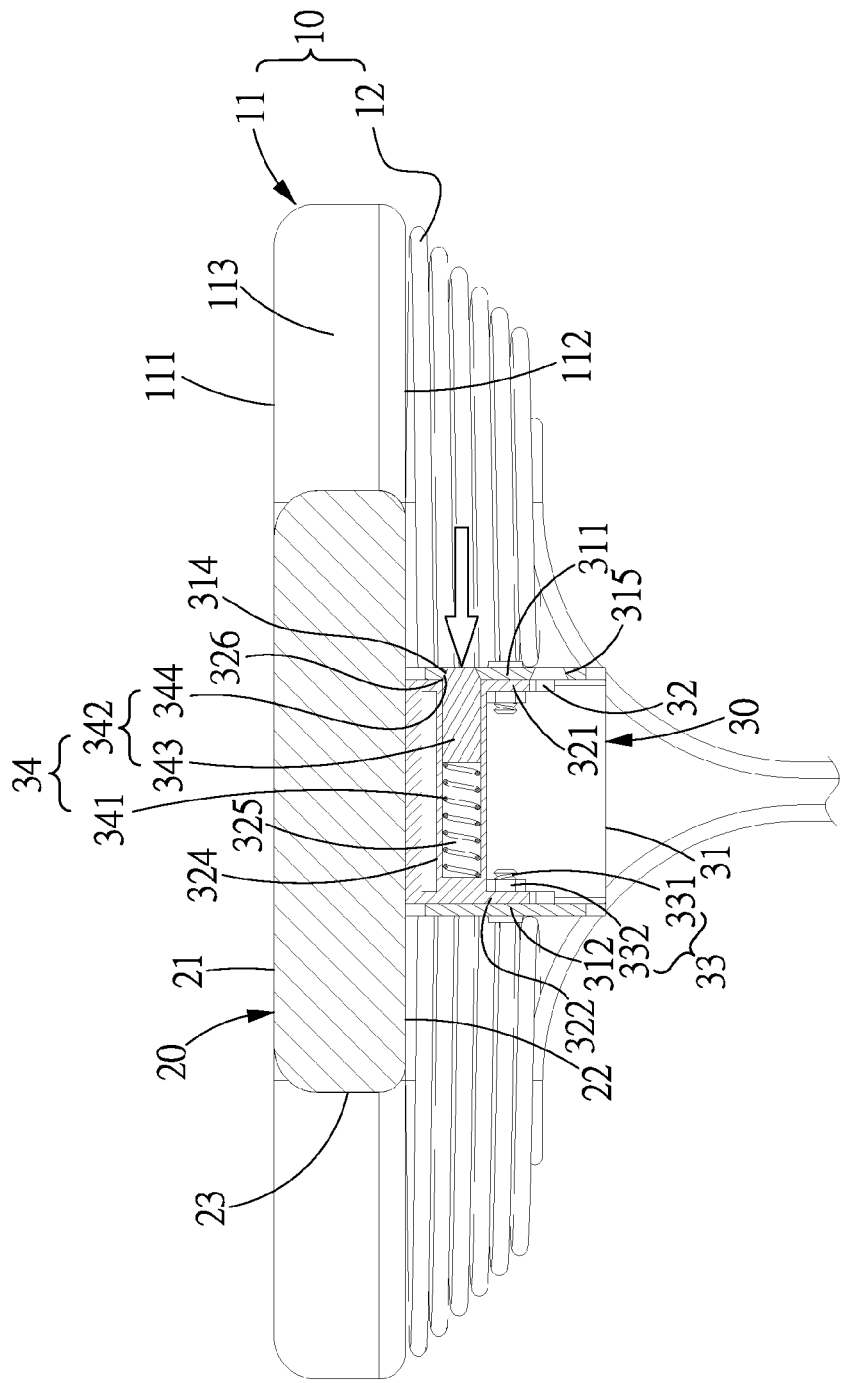
FIG. 12 is a cross sectional view of the bicycle saddle structure with the nose portion in accordance with the present invention.

Referring to FIG. 9, the ends of the elastic portions 122 away from the extension portions 121 can be inclined towards the centers of the elastic supporting bodies 12 symmetrically, so as to form an inwardly rising angle C, and an angle between the inwardly rising angle C and the horizontal direction S2 is 0 to 10 degrees. Referring to FIG. 10, the elastic portions 122 can also be inclined towards the direction near the extension portions 121, so as to form an outwardly rising angle D, and an angle between the outwardly rising angle D and the horizontal direction S2 is 0 to 10 degrees.

The nose portion 20 is pivoted to one side of the saddle portion 11 of the saddle body 10 via a pivoting unit 30 and has a top surface 21 and an opposite bottom surface 22. The top surface 21 is connected to the bottom surface 22 via a lateral surface 23. The top surface 21 of the nose portion 20 can be selectively located at the same level as or vertical to the top surface 111 via the pivoting unit 30.

The pivoting unit 30 is provided with a positioning rack 31, a pivoting rack 32, two pivoting assemblies 33 and a control assembly 34.

The positioning rack 31 is fixed to the bottom surface 112 and has a first positioning surface 311 and an opposite second positioning surface 312. The first and second positioning surfaces 311, 312 are defined with a pivoting hole 313, respectively. The pivoting holes 313 are smooth through holes and are opposite each other. Both sides of the pivoting hole 313 of the first positioning surface 311 are defined with a first locking hole 314 and a second locking hole 315, respectively. The first locking hole 314 is nearer the bottom surface 112 than the second locking hole 315. In the present embodiment, the first and second locking holes 314, 315 are cone-shaped.

The pivoting rack 32 is fixed to the bottom surface 22 and has a first pivoting surface 321 and an opposite second pivoting surface 322. The first and second pivoting surfaces 321, 322 are defined with an assembling hole 323, respectively. The assembling holes 323 are smooth through holes and are opposite each other. Between the first pivoting surface 321 and the second pivoting surface 322 is provided an assembling portion 324 that is defined with an assembling groove 325 and an assembling opening 326 in the first pivoting surface 321.

The pivoting rack 32 is received between the first and second positioning surfaces 311, 312 of the positioning rack 31. The first positioning surface 311 is abutted against the first pivoting surface 321, and the second positioning surface 312 is abutted against the second pivoting surface 322. The pivoting hole 313 of the first positioning surface 311 is located corresponding to the assembling hole 323 of the first pivoting surface 321, and the pivoting hole 313 of the second positioning surface 312 is located corresponding to the assembling hole 323 of the second pivoting surface 322. The pivoting assemblies 33 are provided for pivoting the positioning rack 31 to the pivoting rack 32, each pivoting assembly 33 includes a threaded member 331 and a nut 332. The threaded members 331 are screwed with the nuts 332 after rotatably passing through the pivoting holes 313 and the assembling holes 323, such that the pivoting assemblies 33 are pivotally assembled to the pivoting holes 313 and the assembling holes 323, so as to make the pivoting rack 32 pivot relative to the positioning rack 31.

The control assembly 34 is disposed on the pivoting rack 32 and can be selectively fixed to different positions of the positioning rack 31. The control assembly 34 includes a spring 341 and an engaging member 342. The spring 341 and the engaging member 342 are removably received in the assembling groove 325 of the assembling portion 324 of the pivoting rack 32. The engaging member 342 is divided into a moving section 343 and a cone-shaped engaging portion 344 that is connected to one end of the moving section 343 and has an outer diameter smaller than that of the moving section 343. The moving section 343 is pushed by the spring 341, such that the engaging portion 344 will be protruded out of the assembling opening 326. The shape and size of the engaging portion 344 are corresponding to that of the first and second locking holes 314, 315, such that the engaging portion 344 can pass through the first and second locking holes 314, 315, and the moving section 343 cannot pass through the first and second locking holes 314, 315. When the assembling opening 326 of the pivoting rack 32 is opposite the first locking hole 314 or the second locking hole 315 of the positioning rack 31, the engaging portion 344 of the engaging member 342 will be locked in the first locking hole 314 or the second locking hole 315.

Figure 1:
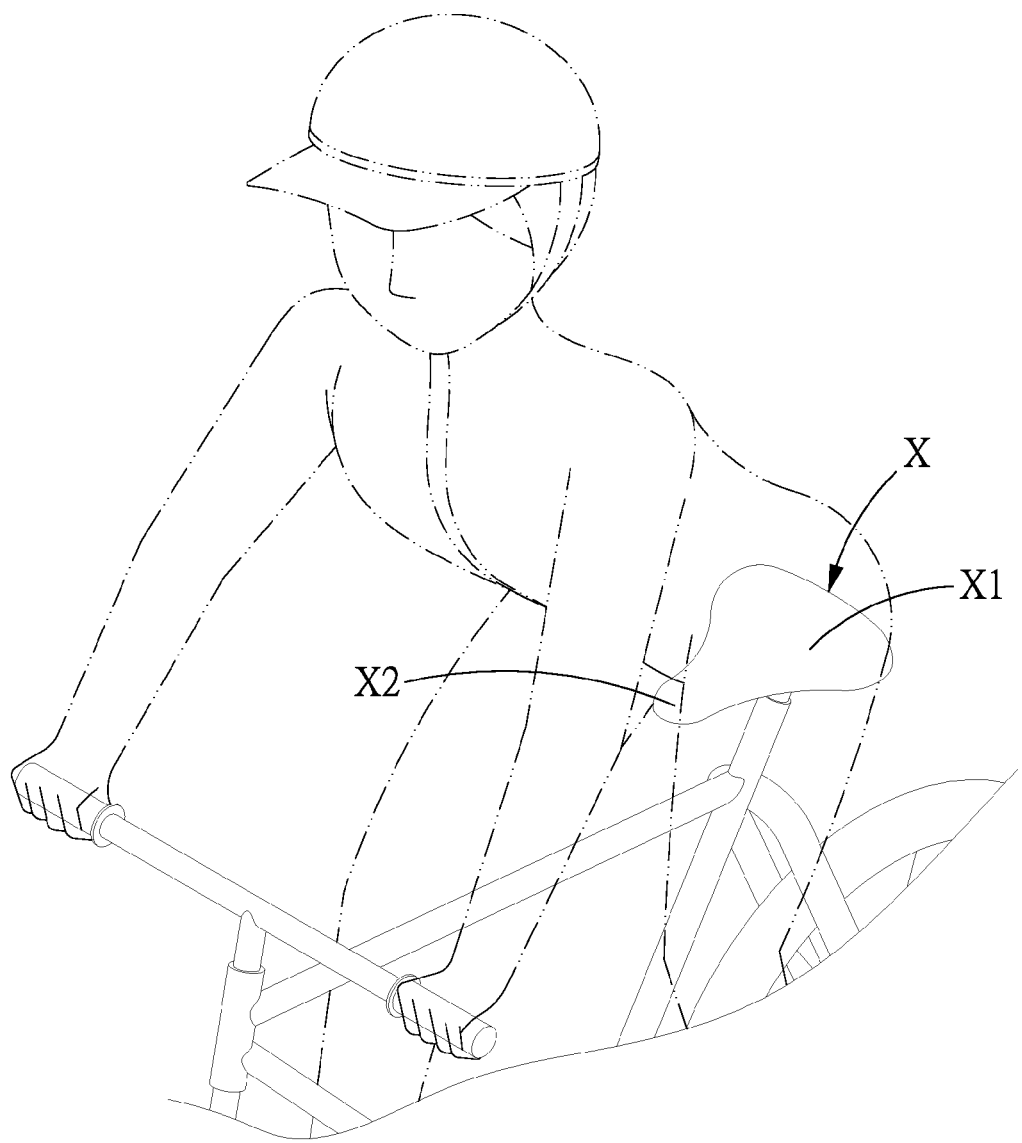
FIG. 1 is an illustrative view of a conventional bicycle saddle.
Figure 2:
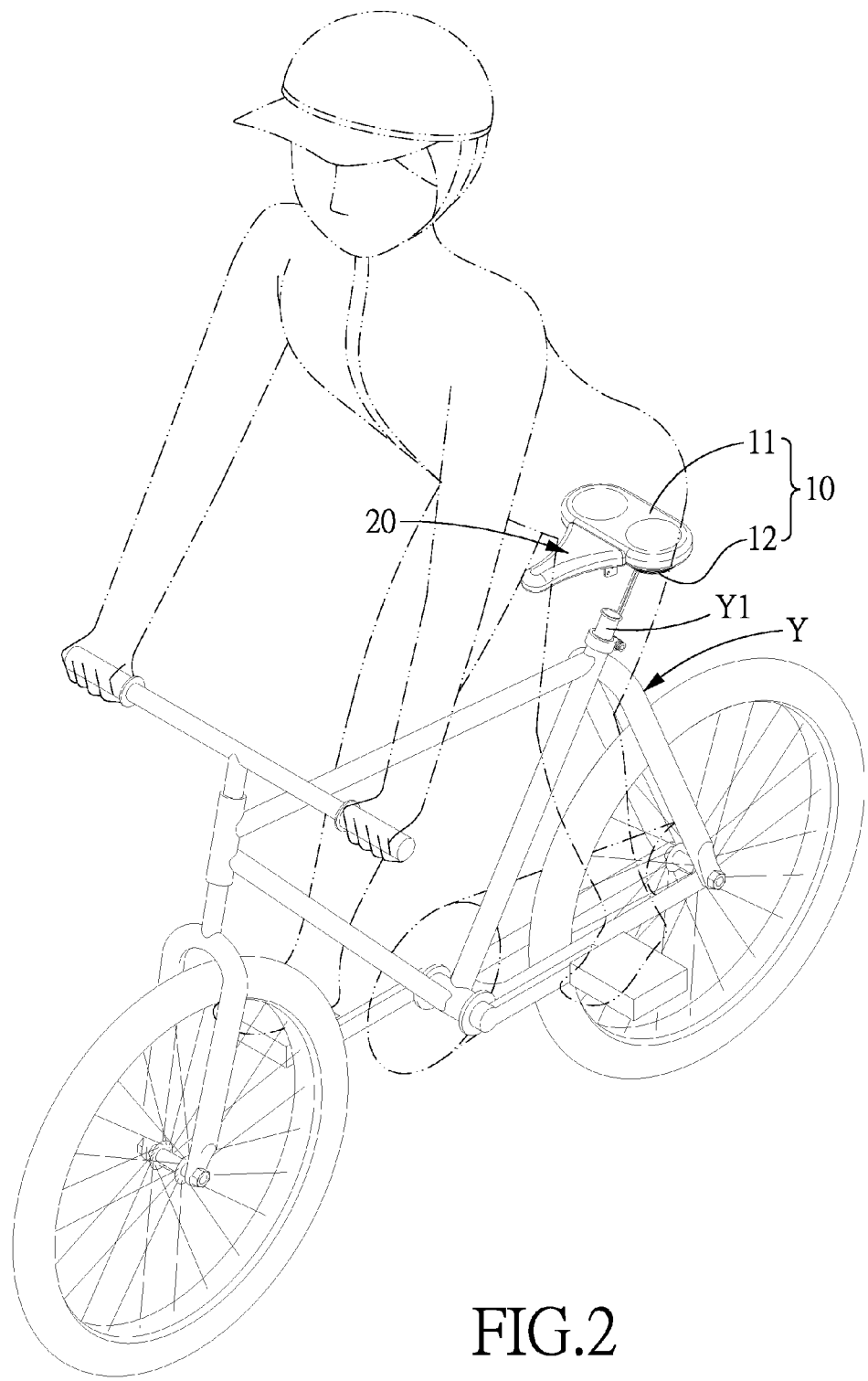
FIG. 2 is an operational view of a bicycle saddle structure with a nose portion in accordance with the present invention.
Figure 3:
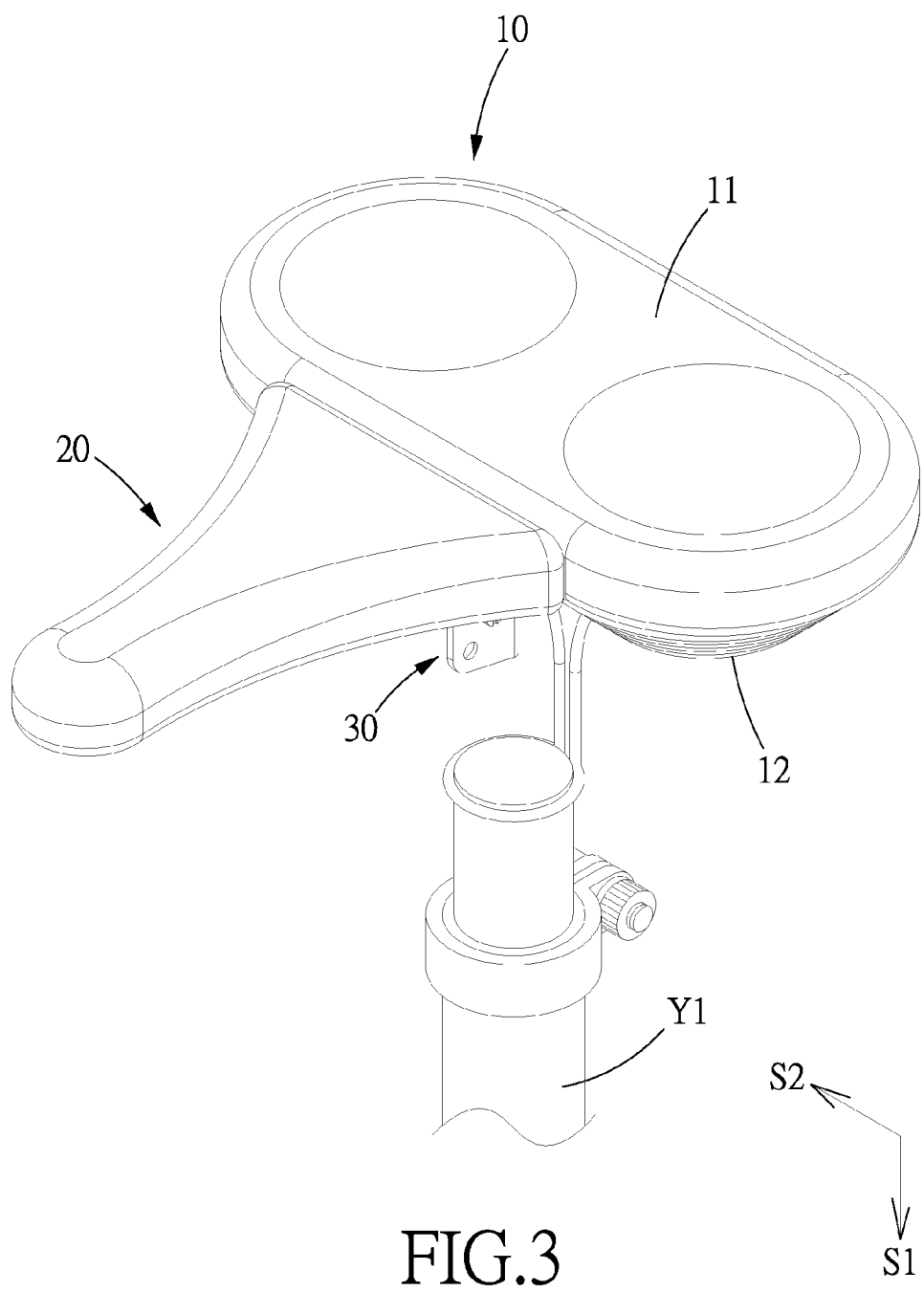
FIG. 3 is a perspective view of the bicycle saddle structure with the nose portion in accordance with the present invention.
Figure 4:
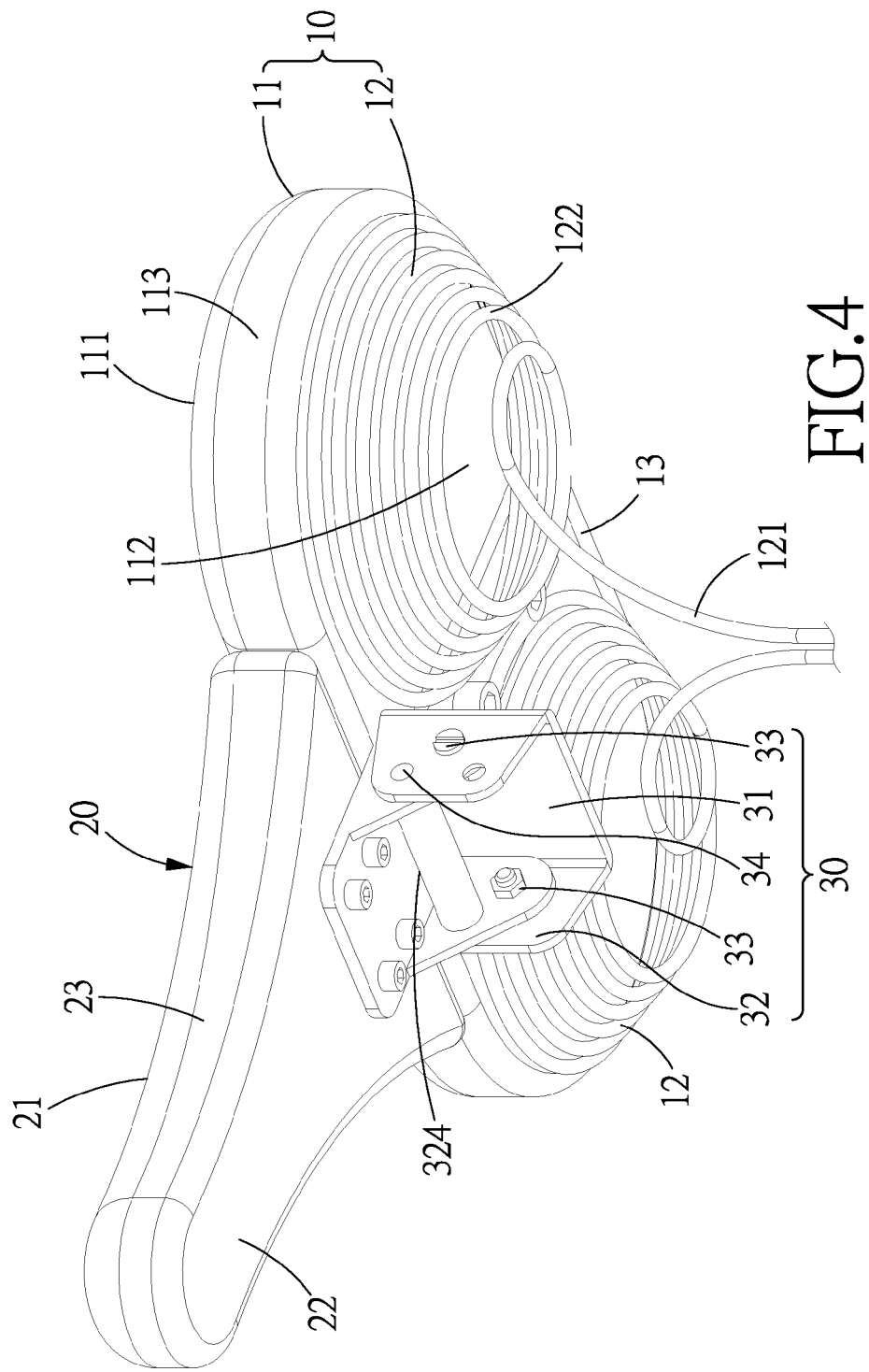
FIG. 4 is another perspective view of the bicycle saddle structure with the nose portion in accordance with the present invention.
Figure 5:
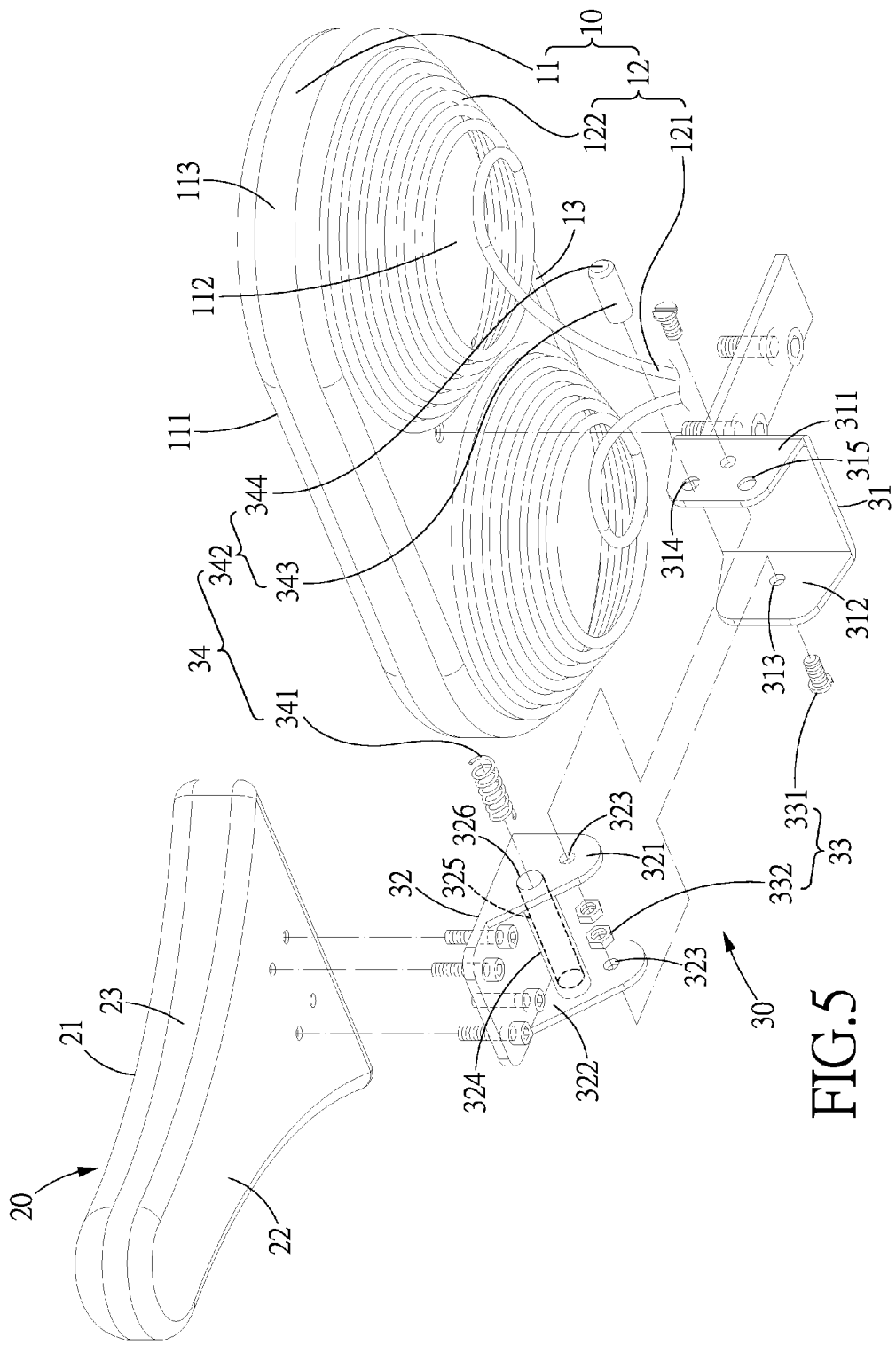
FIG. 5 is an exploded view of the bicycle saddle structure in accordance with the present invention.

The above-mentioned descriptions are the features of the bicycle saddle structure of the present invention, and the structure of the nose-shaped saddle is shown in FIGS. 2-5 and 11-12. The top surface 21 of the nose portion 20 is located at the same level as the top surface 111 of the saddle portion 11, so as to form the saddle with the nose portion 20, such that the rider can sit on the saddle portion 11 with his/her feet clamp both sides of the nose portion 20 as shown in FIG. 2. The center distance A between the elastic portions 122 is specially designed to be 8 to 15 cm, which can meet the requirements of the riders of different ages. In addition, the height B of each elastic portion 122 is 1 to 3 cm, which can meet the requirements of the riders with different body weights and support the rider by the best elasticity.

Since the saddle body 10 is provided with two elastic supporting bodies 12, the elastic supporting bodies 12 can hold the rider's hips when the rider sits on the saddle body 10 and can absorb bumps on the road when riding, so as to improve the riding comfort.

Referring to FIGS. 2-4 and 11-13, the assembling opening 326 of the pivoting rack 32 is opposite the first locking hole 314 of the positioning rack 31, and the moving section 343 of the engaging member 342 is pushed by the spring 341, such that the engaging portion 344 of the engaging member 342 will be locked in the first locking hole 314, so as to prevent the pivoting rack 32 and the nose portion 20 from pivoting relative to the positioning rack 31 and the saddle body 10, thus combining the nose-shaped saddle stably.

Figure 13:
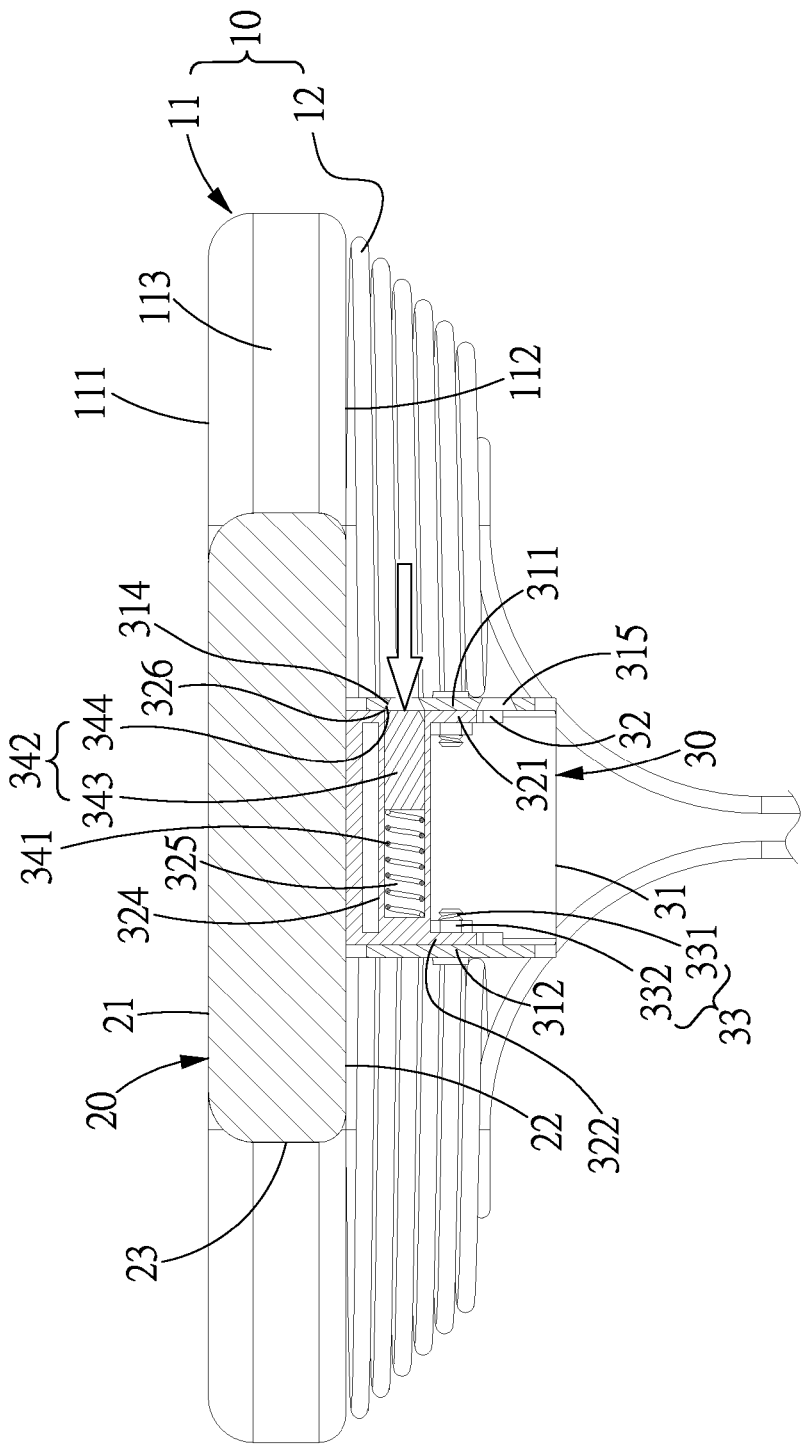
FIG. 13 is an illustrative view showing an engaging member of the bicycle saddle structure being pressed.
Figure 14:
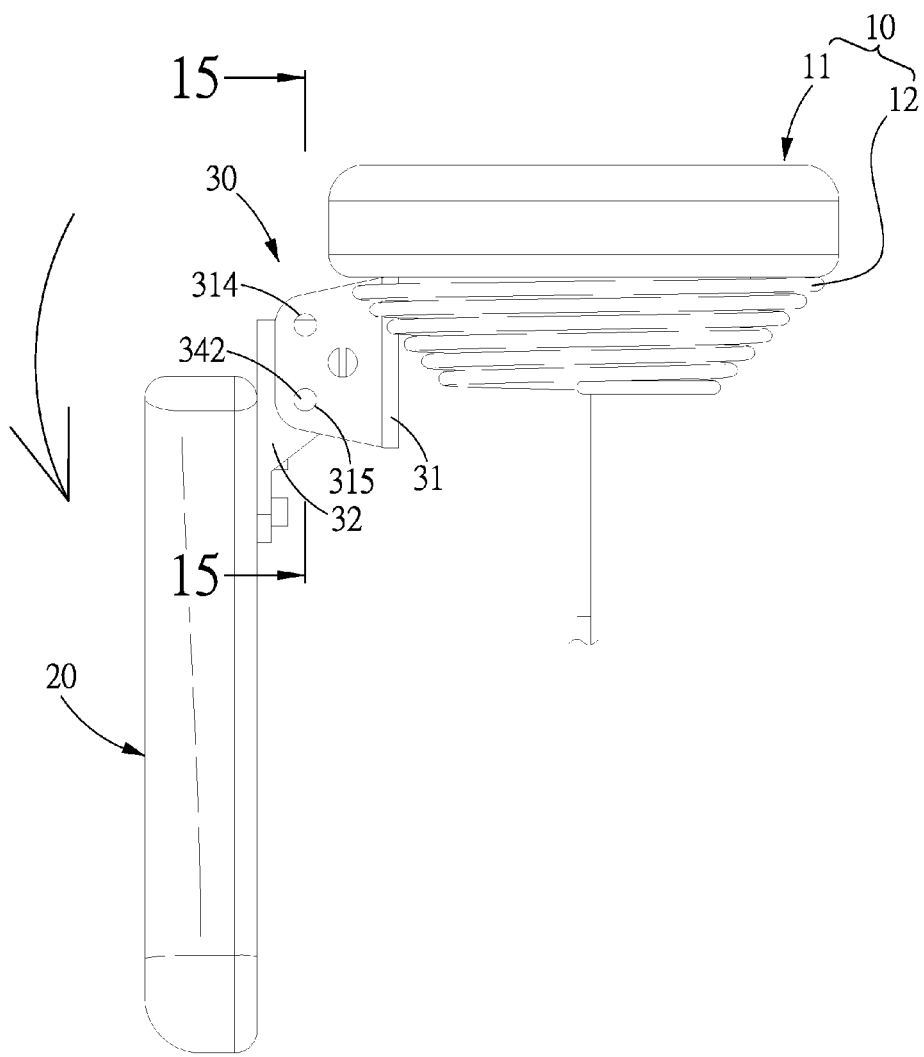
FIG. 14 is an illustrative view showing the nose portion of the bicycle saddle structure being turned.

When not in use, the rider only has to press the engaging portion 344 of the engaging member 342 via the first locking hole 314 to make the moving section 343 of the engaging member 342 compress the spring 341, when the engaging portion 344 is separated from the first locking hole 314 of the positioning rack 31 completely as shown in FIG. 13, the pivoting rack 32 will rotate relative to the positioning rack 31. At that time, the rider can pull the nose portion 20 to make the pivoting rack 32 pivot and release the engaging member 342 as shown in FIG. 14. During the pivoting process of the pivoting rack 32, the assembling opening 326 of the pivoting rack 32 will be separated from the first locking hole 314 and face to the first positioning surface 311, and the first positioning surface 311 will block the control assembly 34 and compress the spring 341 via the engaging member 342, such that the engaging member 342 will be retracted in the assembling groove 325 completely.

Figure 15:
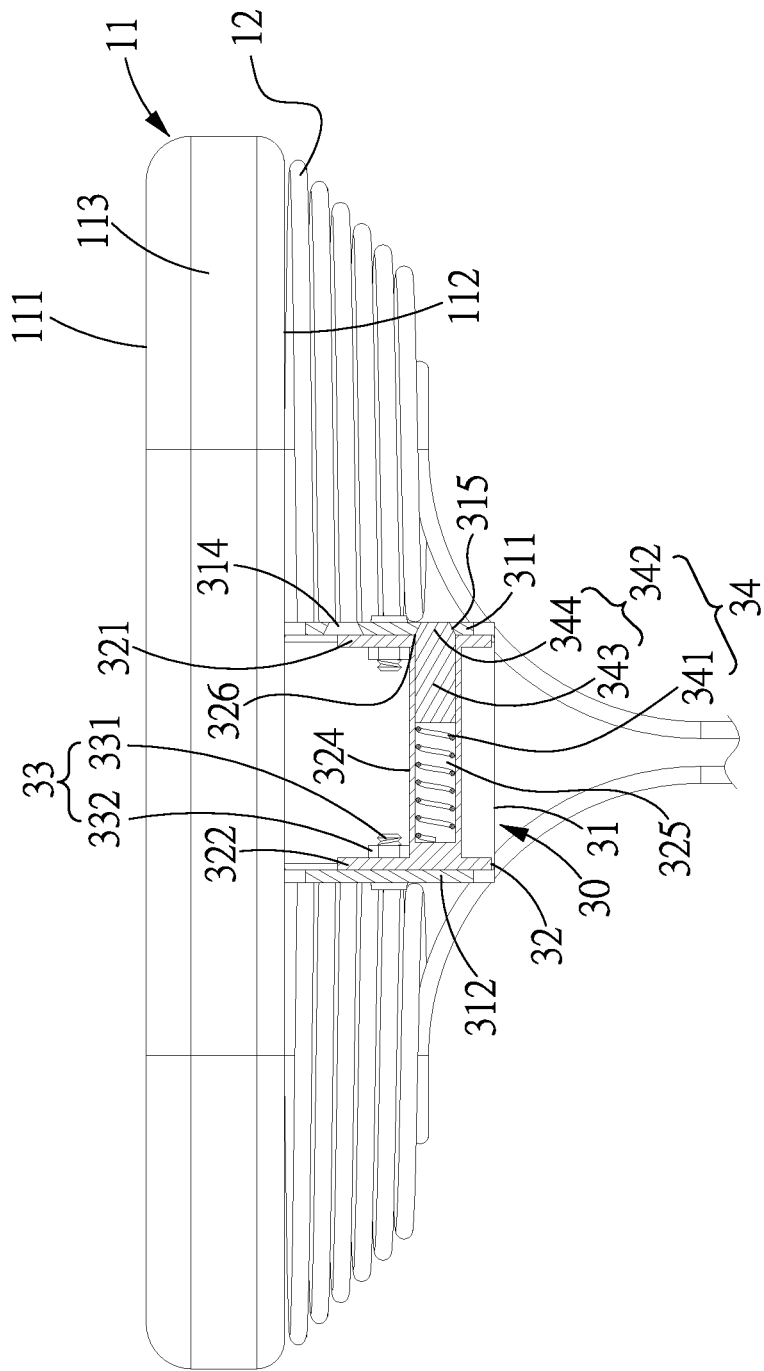
FIG. 15 is a cross sectional view of the bicycle saddle structure without the nose portion in accordance with the present invention.
Figure 16:
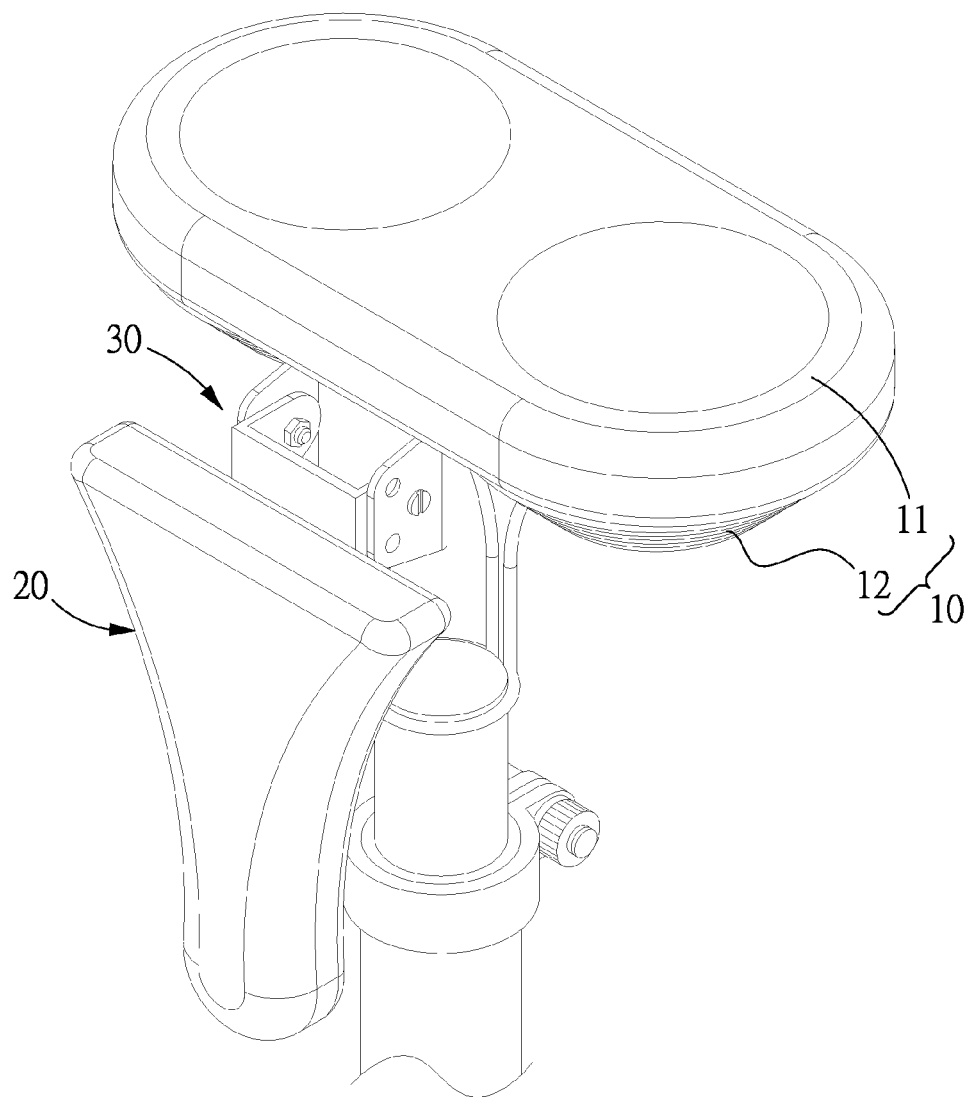
FIG. 16 is a perspective view of the bicycle saddle structure without the nose portion in accordance with the present invention.
Figure 17:
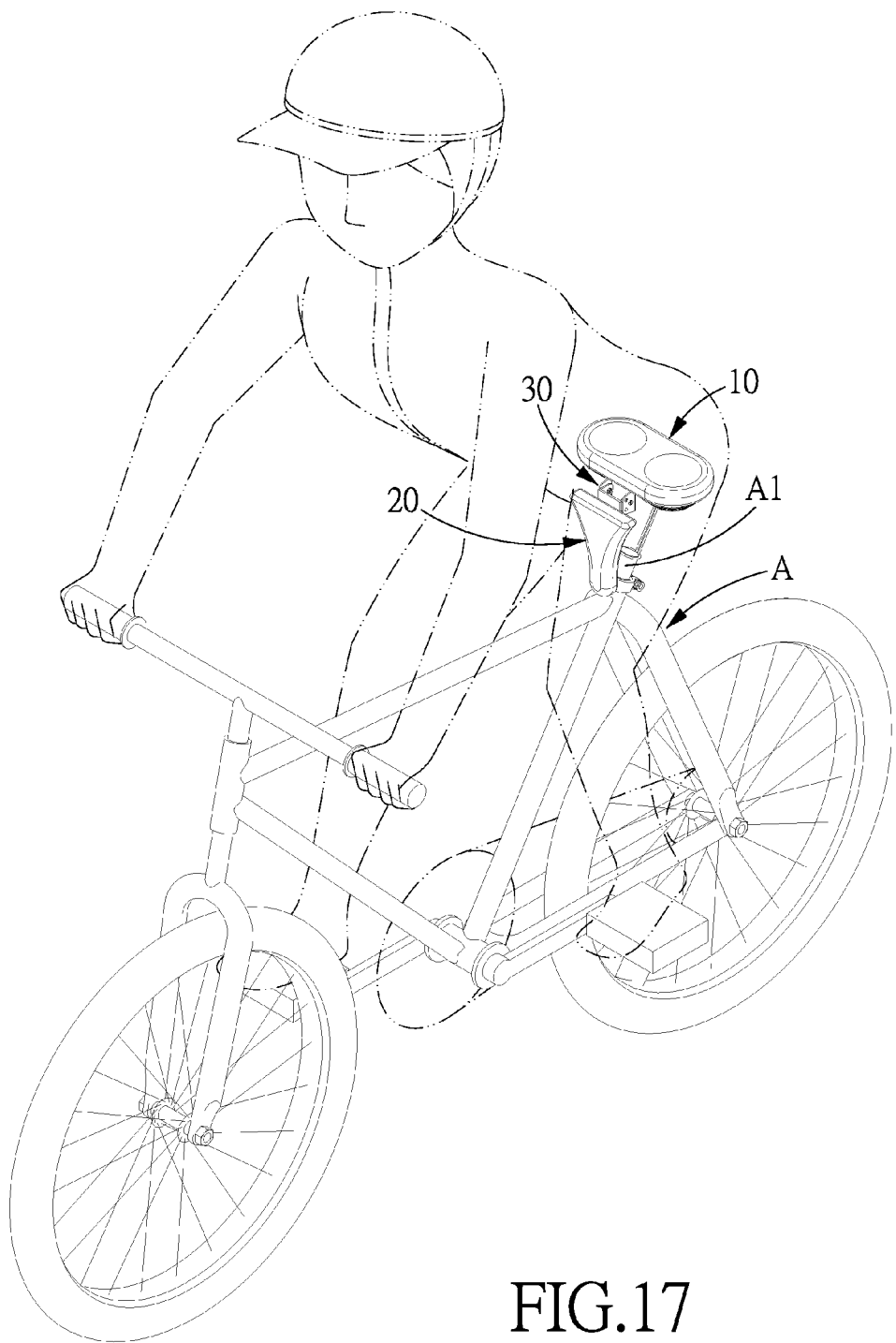
FIG. 17 is an operational view of the bicycle saddle structure without the nose portion in accordance with the present invention.

When the nose portion 20 and the pivoting rack 32 downward pivoting to the position where the assembling opening 326 of the pivoting rack 32 opposite the second locking hole 315 of the positioning rack 31, the control assembly 34 will be released by the first positioning surface 311, and the spring 341 will be restored to push the moving section 343 of the engaging member 342, so as to make the engaging portion 344 of the engaging member 342 locked in the second locking hole 315, thus restricting the pivoting rack 32 as shown in FIG. 15. At that time, the pivoting rack 32 will move the nose portion 20 to make the top surface 21 of the nose portion 20 vertical to the top surface 111 of the saddle portion 11, thus forming the saddle without nose portion as shown in FIGS. 16 and 17. The structure of the pivoting unit 30 for pivoting the nose portion 20 to the saddle body 10 is not limited to that of the present invention, the pivoting unit 30 can also be an ordinary hinge or link mechanism.

To summarize, the bicycle saddle structure of the present invention has high riding comfort and can be changed to the nose-shaped saddle or the saddle without nose portion according to the requirement of the rider. The saddle body 10 can be separated from the nose portion 20 only by pressing the engaging member 342, and the control assembly 34 can be locked automatically after changing the position of the nose portion 20. Thereby, such a structure has high applicability and is convenient to use.

While we have shown and described various embodiments in accordance with the present invention, it should be clear to those skilled in the art that further embodiments may be made without departing from the scope of the present invention.

What is claimed is:

1. A bicycle saddle structure comprising:
   a saddle body being connected to a seat post of a bicycle and provided with a saddle portion and two circular spiral elastic supporting bodies, the saddle portion including a top surface and an opposite bottom surface, between the top surface and the bottom surface being provided a lateral surface, the elastic supporting bodies being disposed on the bottom surface of the saddle portion and located adjacent to each other; and
   a nose portion being pivoted to one side of the saddle portion of the saddle body via a pivoting unit and including a top surface and an opposite bottom surface, the top surface of the nose portion being connected to the bottom surface of the nose portion via a lateral surface, the top surface of the nose portion being selectively located at the same level as or vertical to the top surface of the saddle portion via the pivoting unit;
   wherein the pivoting unit is provided with a positioning rack, a pivoting rack, two pivoting assemblies and a control assembly, the positioning rack is fixed to the bottom surface of the saddle portion, the pivoting rack is fixed to the bottom surface of the nose portion, the pivoting assemblies are provided for pivoting the positioning rack to the pivoting rack, and the control assembly is disposed on the pivoting rack and is selectively fixed to different positions of the positioning rack;
   the positioning rack has a first positioning surface and an opposite second positioning surface, each of the first and second positioning surfaces has a pivoting hole, respectively, the pivoting holes are smooth through holes and are opposite each other, the pivoting rack has a first pivoting surface and an opposite second pivoting surface, each of the first and second pivoting surfaces has an assembling hole, respectively, the assembling holes are smooth through holes and are opposite each other, the pivoting rack is received between the first and second positioning surfaces of the positioning rack, the first positioning surface is abutted against the first pivoting surface, the second positioning surface is abutted against the second pivoting surface, the pivoting hole of the first positioning surface is located corresponding to the assembling hole of the first pivoting surface, the pivoting hole of the second positioning surface is located corresponding to the assembling hole of the second pivoting surface, each pivoting assembly includes a threaded member and a nut, the threaded members are screwed with the nuts after rotatably passing through the pivoting holes and the assembling holes, such that the pivoting assemblies are pivotally assembled to the pivoting holes and the assembling holes, so as to make the pivoting rack pivot relative to the positioning rack.

2. The bicycle saddle structure as claimed in claim 1, wherein the positioning rack is fixed to the bottom surface of the saddle portion, both sides of the pivoting hole of the first positioning surface of the positioning rack are defined with a first locking hole and a second locking hole, respectively, the first locking hole is nearer the bottom surface of the saddle portion than the second locking hole, between the first pivoting surface and the second pivoting surface of the pivoting rack is provided an assembling portion that is defined with an assembling groove and an assembling opening in the first pivoting surface, the control assembly is disposed on the pivoting rack and is selectively fixed to different positions of the positioning rack, the control assembly includes a spring and an engaging member which are removably received in the assembling groove of the assembling portion of the pivoting rack, the engaging member is divided into a moving section and an engaging portion connected to one end of the moving section, the moving section is pushed by the spring, such that the engaging portion will be protruded out of the assembling opening, when the assembling opening of the pivoting rack is opposite the first locking hole or the second locking hole of the positioning rack, the engaging portion of the engaging member will be locked in the first locking hole or the second locking hole.

3. The bicycle saddle structure as claimed in claim 2, wherein the first and second locking holes of the first positioning surface of the positioning rack are cone-shaped, the engaging member is divided into the moving section and the cone-shaped engaging portion that is connected to the one end of the moving section and has an outer diameter smaller than that of the moving section, the shape and size of the engaging portion are corresponding to that of the first and second locking holes, such that the engaging portion can pass through the first and second locking holes, and the moving section cannot pass through the first and second locking holes.

4. The bicycle saddle structure as claimed in claim 1, wherein each elastic supporting body is formed by an extension portion and an elastic portion formed at one end of the extension portion, the extension portion is extended along a vertical direction, a horizontal direction is vertical to the vertical direction, and the elastic portion is a spiral cone structure enlarged from the extension portion gradually.

5. The bicycle saddle structure as claimed in claim 4, wherein a center distance between the elastic portions in the horizontal direction is 8 to 15 cm, and a height of each elastic portion is 1 to 3 cm.

6. The bicycle saddle structure as claimed in claim 4, wherein the spiral number of the elastic portion is six.

7. The bicycle saddle structure as claimed in claim 4, wherein ends of the elastic portions away from the extension portions are connected by a connecting section.

8. The bicycle saddle structure as claimed in claim 4, wherein ends of the elastic portions away from the extension portions are inclined towards centers of the elastic supporting bodies symmetrically, so as to form an inwardly rising angle.

9. The bicycle saddle structure as claimed in claim 8, wherein an angle between the inwardly rising angle and the horizontal direction is 0 to 10 degrees.

10. The bicycle saddle structure as claimed in claim 4, wherein ends of the elastic portions away from the extension portions are inclined towards centers of the elastic supporting bodies symmetrically, the elastic portions are inclined towards the direction near the extension portions, so as to form an outwardly rising angle.

11. The bicycle saddle structure as claimed in claim 10, wherein an angle between the outwardly rising angle and the horizontal direction is 0 to 10 degrees.

* * * * *